United States Patent
Brass et al.

(10) Patent No.: US 9,162,305 B2
(45) Date of Patent: Oct. 20, 2015

(54) METHOD OF WELDING A WEAR LAYER ONTO A PARENT MATERIAL USING A PLURALITY OF FLUX-CORED WIRE ELECTRODES, METAL POWDER AND WELDING POWDER

(75) Inventors: Walter Brass, Witten (DE); René Scholz, Grünstadt (DE)

(73) Assignee: Gustav Wiegard Maschinenfabrik GmbH & Co. KG, Witten (DE)

( * ) Notice: Subject to any disclaimer, the term of this patent is extended or adjusted under 35 U.S.C. 154(b) by 1639 days.

(21) Appl. No.: 12/236,925

(22) Filed: Sep. 24, 2008

(65) Prior Publication Data
US 2009/0078689 A1 Mar. 26, 2009

Related U.S. Application Data

(63) Continuation of application No. PCT/EP2007/002131, filed on Mar. 12, 2007.

(30) Foreign Application Priority Data

Mar. 24, 2006 (DE) .......................... 10 2006 013 552

(51) Int. Cl.
*B23K 9/04* (2006.01)
*B23K 9/18* (2006.01)
(Continued)

(52) U.S. Cl.
CPC ................ *B23K 9/048* (2013.01); *B23K 9/188* (2013.01); *B23K 9/324* (2013.01); *B23K 25/005* (2013.01); *B23K 2201/04* (2013.01)

(58) Field of Classification Search
CPC .................................... B23K 9/04; B23K 9/24
USPC ..................... 219/73.11, 73.2, 76.1, 136, 162
See application file for complete search history.

(56) References Cited

U.S. PATENT DOCUMENTS 2,810,063 A  10/1957  Brashear, Jr.
3,271,553 A   9/1966  Johnson
(Continued)

FOREIGN PATENT DOCUMENTS

AT    276 906      12/1969
CN    1511670 A     7/2004
(Continued)

OTHER PUBLICATIONS

International Search Report, dated Jul. 30, 2007.
(Continued)

*Primary Examiner* — Dana Ross
*Assistant Examiner* — Ayub Maye
(74) *Attorney, Agent, or Firm* — Laurence A. Greenberg; Werner H. Stemer; Ralph E. Locher

(57) ABSTRACT

A method of welding a wear layer onto a parent material, wherein a welding current is applied to a first wire electrode and to at least one second wire electrode. The first wire electrode and at least one second wire electrode are continuously fed to the parent material for producing a common weld pool. Metal powder and welding powder are fed to the weld pool. The wire electrodes are flux-cored wire electrodes, having a core and a covered electrode. The flux-cored wire electrodes have a higher alloy than a weld deposit analysis of the wear layer to be welded on the parent material. The covered electrode of the flux-cored wire electrodes includes an alloy, which has magnetization properties suitable for adhesion of the metal powder.

24 Claims, 8 Drawing Sheets

(51) Int. Cl.
    *B23K 9/32*      (2006.01)
    *B23K 25/00*      (2006.01)

(56) References Cited

U.S. PATENT DOCUMENTS

| | | | |
|---|---|---|---|
| 6,127,644 A * | 10/2000 | Singh et al. | 219/73.11 |
| 6,331,688 B1 * | 12/2001 | Hallen et al. | 219/73.21 |
| 2002/0079301 A1 | 6/2002 | Bong et al. | |
| 2003/0152716 A1 | 8/2003 | Hallén et al. | |
| 2006/0081579 A1 * | 4/2006 | Kotecki | 219/145.22 |

FOREIGN PATENT DOCUMENTS

| | | |
|---|---|---|
| DE | 2 108 614 | 10/1971 |
| DE | 2239021 A1 | 3/1973 |
| DE | 2304753 A1 | 8/1974 |
| DE | 697 27 391 T2 | 11/2004 |
| JP | 2-52174 A | 2/1990 |
| WO | 03/068441 A1 | 8/2003 |

OTHER PUBLICATIONS

German Office Action, dated Oct. 4, 2006.
"Metal-Powder Twin-Wire Submerged-Arc Welding", Welding and Metal Fabrication, IPC Ltd., Aug. 1998, pp. 21-22, and 24, vol. 66, No. 7, Haywards Heath, GB.

* cited by examiner

METHOD OF WELDING A WEAR LAYER ONTO A PARENT MATERIAL USING A PLURALITY OF FLUX-CORED WIRE ELECTRODES, METAL POWDER AND WELDING POWDER

BACKGROUND OF THE INVENTION

Field of the Invention

The present invention relates to a method for welding a wear layer onto a parent material, in particular a method for surfacing by submerged-arc welding, wherein a first wire electrode and at least one second wire electrode each have a welding current applied to them, and are fed continuously to the parent material in order to produce a common weld pool, wherein metal powder is supplied to the weld pool, and wherein welding powder is supplied to the weld pool.

Submerged-arc welding is a known process which is used virtually exclusively for fully mechanized welding operation. It is primarily used for connecting welds because this results in good economic utilization in this case as a result of the deep penetration as a consequence of the process characteristics—⅔ (parent material) and ⅓ (increased seam height) effect are referred to. Superimposed on this is the possibility of using high energy densities, or else the use of specific welding powders for high welding rates of up to approximately 2.5 m/min.

Surfacing by submerged-arc welding represents one variant of submerged-arc welding. This method is used to weld layers over a large area onto a parent material, for example in order to repair a roller. The process-dependent performance values, but not the high level of penetration, are admittedly particularly desirable for surfacing by submerged-arc welding. The penetration profile which results in this case leads to a highly dendritic structure which in turn has a tendency to crack formation with the alloys that are used here and the hardnesses associated therewith. Furthermore, this means that, because of the high level of mixing resulting from the parent material, the desired characteristics of the weld deposit may be expected only from the third weld layer. In addition, as a consequence of the increased amount of heat introduced, increased intrinsic stresses in the component and thus faults must be expected. In summary, it can be stated that, as a result of the very specific characteristics, priority should not necessarily be granted to the submerged-arc welding method for surfacing by welding.

In order to configure the penetration profile for surfacing by submerged-arc welding more advantageously, strip electrodes are used as a filler material, thereby reducing the mixing level to about 25%. By way of example, in this context, DE 22 38 321 and U.S. Pat. No. 2,810,063 propose the use of a strip electrode and the addition of metal powder into the weld pool. The strip electrode has a tendency to produce less penetration. This characteristic results inter alia from the oscillating arc and/or metal drops passing over, which migrate to and fro on the strip edges. Furthermore, the strip electrode produces a reduced current density and therefore less penetration, because of the tendency to have a larger cross section. Inter alia, the addition of metal powder has an energy-absorbing, that is to say cooling, effect, in such a way that this can likewise reduce the penetration. However, in this case, the number of layers must still comprise two or three weld beads one above the other in this case, until a utilizable outer layer, that is to say a wear layer, is created.

However, the use of a strip electrode is restricted as a result of the lack of availability of the respective strip alloys. This is compensated for by means of an alloying welding powder, although in general this is possible only for total alloy contents of the weld deposit of up to about 15%. This disadvantage is eliminated by means of sintered strips, as a result of which alloying-neutral welding powders can be used for this purpose. However, sintered strips cannot be produced in all alloys, and are comparatively quite expensive.

In summary, it can be stated that the known methods for surfacing by submerged-arc welding, as they are used for example for the reconditioning of rollers, rolls or similar elongated work pieces, have the aim of avoiding deep penetration, in order to ensure that there is as little mixing as possible between the applied layer and the parent material. Nevertheless, the alloy composition of a layer which is welded directly onto the parent material is disadvantageously influenced by the melted parent material in such a way that a plurality of layers must be welded on one above the other in order to produce an outer wear layer which complies with the requirements for alloying and hardness. By way of example, at least two layers must be welded on in order to produce a wear layer with a thickness of 2 mm.

The disadvantage of known methods is therefore the number of layers that have to be welded on in order to produce a usable wear layer, and the resultant amounts of material, energy and time that are consumed.

BRIEF SUMMARY OF THE INVENTION

The object of the present invention is now to propose a method for surfacing by welding which allows a wear layer to be welded on in a single process without any need to weld a plurality of layers on top of one another. The aim is that the single wear layer produced according to the invention will have the same or better characteristics, in particular in terms of hardness, corrosion and/or wear, as a conventionally produced outer wear layer produced by multilayer welding.

According to the invention, this object is achieved according to a method as set forth in the claims. Since the wire electrodes are flux-cored wire electrodes having a core and having a casing electrode, wherein the flux-cored wire electrode has a higher alloy than the weld deposit analysis of the wear layer to be welded on, and wherein the casing electrode of the flux-cored wire electrode is composed of an alloy which has suitable magnetization characteristics for adhesion of the metal powder, the following advantageous effect is achieved. Wire electrodes, in particular flux-cored wire electrodes, produce deeper penetration than strip electrodes and greater mixing with the parent material, which is actually intended to be avoided according to the recommendations from the prior art. For example, mixtures of 40-50%, which are well beyond the recommendations of the prior art for surfacing by submerged-arc welding, are advantageous for the method proposed here. As a result of the deep penetration and the considerable feed of high-alloyed filler materials, the weld pool acts like a crucible, and the molten parent material is effectively converted to a single, sufficiently alloyed, wear layer. The composition of a layer which has been welded on in a manner such as this using the single-layer technique according to the invention can thus be adjusted by suitable adjustment of the welding parameters, as well as the quantity and selection of the metal powder that is fed in and/or the flux-cored wire electrodes, such that it corresponds to the composition of a third layer welded on according to the conventional method with a low level of mixing. The use of flux-cored wire electrodes also results in a further possibility which is not feasible, for example, when using solid wire electrodes. If a highly-alloyed solid wire is selected, this cannot, in general, be magnetized. However, the high alloying components are required for preparation of the weld pool. However, the use of a flux-cored wire electrode makes it possible to use a casing electrode which can be magnetized well, to which the metal powder can adhere well, correspondingly allowing a large amount of metal powder to be transported into the weld pool. This could not be achieved using a solid wire electrode since a solid wire electrode is either highly alloyed and accordingly cannot be magnetized or can be magnetized only weakly, or else is low-alloyed and although it can be magnetized it is unsuitable because of the low content of alloying elements, for alloying the weld bath for the desired alloy content of the single wear layer to be welded on. In addition, the welding current density and thus the desired penetration as well as the amount of the adhering metal powder can be influenced conveniently via the thickness and the diameter of the casing electrode, and, for example, it is possible to select a casing electrode with thin walls, thus resulting in a comparatively small cross section and thus a comparatively high current density with a large casing area at the same time, that is to say area for the metal powder to adhere to. Apart from creepage currents, the core generally transmits little welding current, which means that the adjustment can preferably be carried out by the configuration of the casing electrode. It should be noted that possibilities such as these are not feasible with a solid wire electrode since the cross-sectional area and the casing area are directly dependent on one another. Another noteworthy factor is that the method proposed here saves both, material, energy and processing time since only a single layer needs to be welded on. It has likewise been found that the layer thickness and thus the surfacing performance can be virtually doubled by use of the method according to the invention.

In one advantageous arrangement of the proposed method, it has been found that particularly good results can be achieved if the flux-cored wire electrode has a chromium content which is approximately twice as high as the single wear layer to be produced. A typical wear layer, which is welded onto a continuous cast roller, contains, for example, approximately 12-14% of chromium, so that a content of approximately 24-28% of chromium in the flux-cored wire electrode leads to conversion of the molten parent material and the supplied metal powder into a wear layer with 12-14% of chromium.

In one advantageous arrangement of the proposed method, it has been found that particularly good results can be achieved if the flux-cored wire electrode has a nickel content which is approximately twice as high as that of the single wear layer to be produced. A typical wear layer, which is welded onto a continuous cast roller, contains, for example, approximately 3-4% of nickel, so that a content of approximately 6-8% of nickel in the flux-cored wire electrode leads to conversion of the molten parent material and of the supplied metal powder into a wear layer of 3-4% of nickel.

In one advantageous arrangement of the proposed method, it has been found that particularly good results can be achieved if the flux-cored wire electrode has a molybdenum content which is approximately twice as high as that of the single wear layer to be produced. A typical wear layer which is welded onto a continuous cast roller, contains, for example approximately 0.5-1% of molybdenum, so that a content of about 1-2% of molybdenum in the flux-cored wire electrode leads to conversion of the molten parent material and the supplied metal powder into a wear layer with 0.5-1% of molybdenum.

In one advantageous arrangement of the present invention, the flux-cored wire electrode may have a circular cross-sectional area, wherein the diameter of the flux-cored wire electrode is approximately 2 to 3.2 mm. These comparatively thin flux-cored wire electrodes have been found to be particularly advantageous for production of deep penetration.

Furthermore, in order to achieve deep penetration, each flux-cored wire electrode has a welding current of approximately 300 to 475 A applied to it.

It is likewise advantageously possible that the volume of the casing electrode makes up approximately 70% of the total volume of the flux-cored wire electrode.

In order to ensure magnetization of the casing electrode, it is advantageous to apply direct current to the flux-cored wire electrodes, wherein the +pole is connected to the flux-cored wire electrode.

In one advantageous arrangement of the proposed method, it is possible to provide that the flux-cored wire electrodes are fed essentially parallel, but at a selected distance from one another. By the selection of an optimized distance between the flux-cored wire electrodes, the precondition for magnetic influence is created. In contrast to a strip electrode, this also creates the possibility for metal powder to be transported into the weld pool through the space between the two flux-cored strip electrodes. The amount of metalliferous powder supplied can accordingly be increased in comparison to that when using a strip electrode.

It is advantageously also possible to provide for the flux-cored wire electrodes to oscillate transversely to the welding direction. By this measure it is in particular possible to avoid dendritic seam formation, the so-called dendrite trunk, and makes it possible to set the mixing level. Finally, this measure results in an overall improvement in the resistance to cracking of the welding-on layer. The small increased seam height resulting from the oscillation also results in low costs.

In one advantageous arrangement of the proposed method, it is possible to provide that the flux-cored wire electrode has, as a sum of casing electrode and core, a content of approximately <0.08% carbon; 0.2 to 0.3% silicon; 0.6 to 0.8% manganese; 24 to 28% chromium; 6 to 8% nickel, 1 to 2% molybdenum and 0.1 to 0.3% vanadium. A composition such as this offers the advantage that the mixing to be expected with the parent material will result in the wear layer having the normal material composition for continuous cast rollers with 12-14% of chromium, 3-4% of nickel and 0.5-1% of molybdenum. This example illustrates one possible choice of the alloying elements of the flux-cored wire electrode with respect to the parent material, wherein the alloy choice should comply with the requirement that the flux-cored wire electrode should have alloying which is twice as high as that of the wear layer to be welded on.

In a further advantageous arrangement to the present method, it is possible to provide that the casing electrode of the flux-cored wire electrode has a content of approximately <0.05% C; <0.10% Si; <0.40% Mn; <0.015% P; and <0.015% S. A casing electrode with the alloy composition mentioned above has primarily a good magnetizability. This characteristic is therefore particularly advantageous in order to allow sufficient metal powder to adhere to the flux-cored wire electrode, which metal powder should be transported into the weld pool.

In a further advantageous arrangement of the present method, it is possible to provide that the composition of the metal powder corresponds to the weld deposit analysis of the wear layer to be welded on. This measure makes it possible to produce a wear layer which is extremely homogeneous with regard to the alloy composition. In particular, this effect is due to the fact that, for example, discrepancies in the amounts of the metal powder supplied, for example by a malfunction of the feed device, in principle will not result in any discrepancy in the alloy composition of the wear layer to be produced, at the most the thickness of the wear layer will change because less metal powder has been supplied.

It is advantageously possible to provide for the metal powder to have ferritic components, so that coupling of the metal powder in the magnetized casing electrodes through which current is passed is advantageously allowed.

It is also advantageously provided that the metal powder is fed in a currentless manner, so that it is melted on by the process heat in the weld pool and can extract excess heat from the weld pool. Accordingly, by the metering of the metal powder, it is possible to influence the weld pool temperature and thus the formation of the weld pool in a reasonable manner.

In a further advantageous arrangement of the proposed method, it is possible to provide for a metal powder to be used in gas-atomized or water-atomized form. Inter alia, this results in the advantage that gas-atomized powders can be fed more easily since they have a fine grain size and are round. In contrast, metal powder is cheaper in water-atomized form.

Alternatively, it is likewise possible to provide for a metal powder to be used in agglomerated form. Agglomerated metal powder has the advantage that it can be produced with any desired alloy composition.

In one advantageous arrangement of the proposed method, it is possible to provide that the metal powder has a content of approximately <0.08% carbon; 0.15 to 0.3% silicon; 0.4 to 0.8% manganese; 12 to 14% chromium; 3 to 4% nickel, 0.5 to 1% molybdenum and 0.1 to 0.3% vanadium. According to the invention, this can then correspond to a composition of the wear layer to be welded on. The ratio between "higher" and "lower" alloy between the flux-cored wire electrode and the metallic powder is also evident here. It can be seen that the desired alloy composition of the wear layer is obtained in particular by the content of chromium, nickel and molybdenum in the flux-cored wire electrode being approximately twice as high.

In a further advantageous arrangement of the present method, it is possible to provide for an alloying-neutral welding powder to be used. An alloying-neutral welding powder has no significant influence on the alloy composition of the wear layer to be welded on. In principle, the use of an alloying-neutral welding powder avoids one possible disturbing factor.

It is also advantageously possible to provide for the welding powder to be a mineral welding powder, such that the welding powder can advantageously assist metallurgical objectives, such as the formation of the weld seam. In addition, the welding powder prevents the liquid weld pool from running away.

In order to further optimize the proposed method, it is possible to provide for a welding powder to be used whose slag has a high viscosity and good slag solubility at a raised working temperature, taking into account use on rotationally symmetrical components. This measure further increases the process reliability of the proposed method for surfacing by submerged-arc welding.

It is also advantageously possible to provide a welding powder to have a content of approximately 10% $SiO_2+TiO_2$; 35% $Al_2O_3+MnO$; 50% $CaF_2$. The proposed welding powder allows good slag removal even at a working temperature of up to 350° C. Furthermore, the proposed welding powder assists the requirements for the viscosity of the slag in order that it forms the seam and does not run away, which would lead to poor slag solubility.

The proposed method is particularly advantageously suitable for processing of symmetrical bodies of revolution, such as rollers from cold-rolling installations. In this context, it is advantageously possible to provide for the parent material to be a roller, wherein the flux-cored wire electrodes, the metal powder and the welding powder are fed through a welding head, wherein the roller is caused to rotate underneath the welding head, and wherein the welding head is pushed forward in the longitudinal direction of the roller.

In a further advantageous arrangement of the present method, it is possible to provide for the wear layer to be composed of approximately 25% welding wire, 25% of metal powder and 50% of the melted-on surface of the work piece. This extremely high degree of melting of the work piece surface can actually be achieved only by the method proposed according to the invention. However, a considerable proportion of the material can accordingly be exploited advantageously to produce the wear layer.

Further features and advantages of the present invention will become evident from the following description of preferred exemplary embodiments and with reference to the attached FIGURES, in which:

DESCRIPTION OF THE INVENTION

Figure 1:
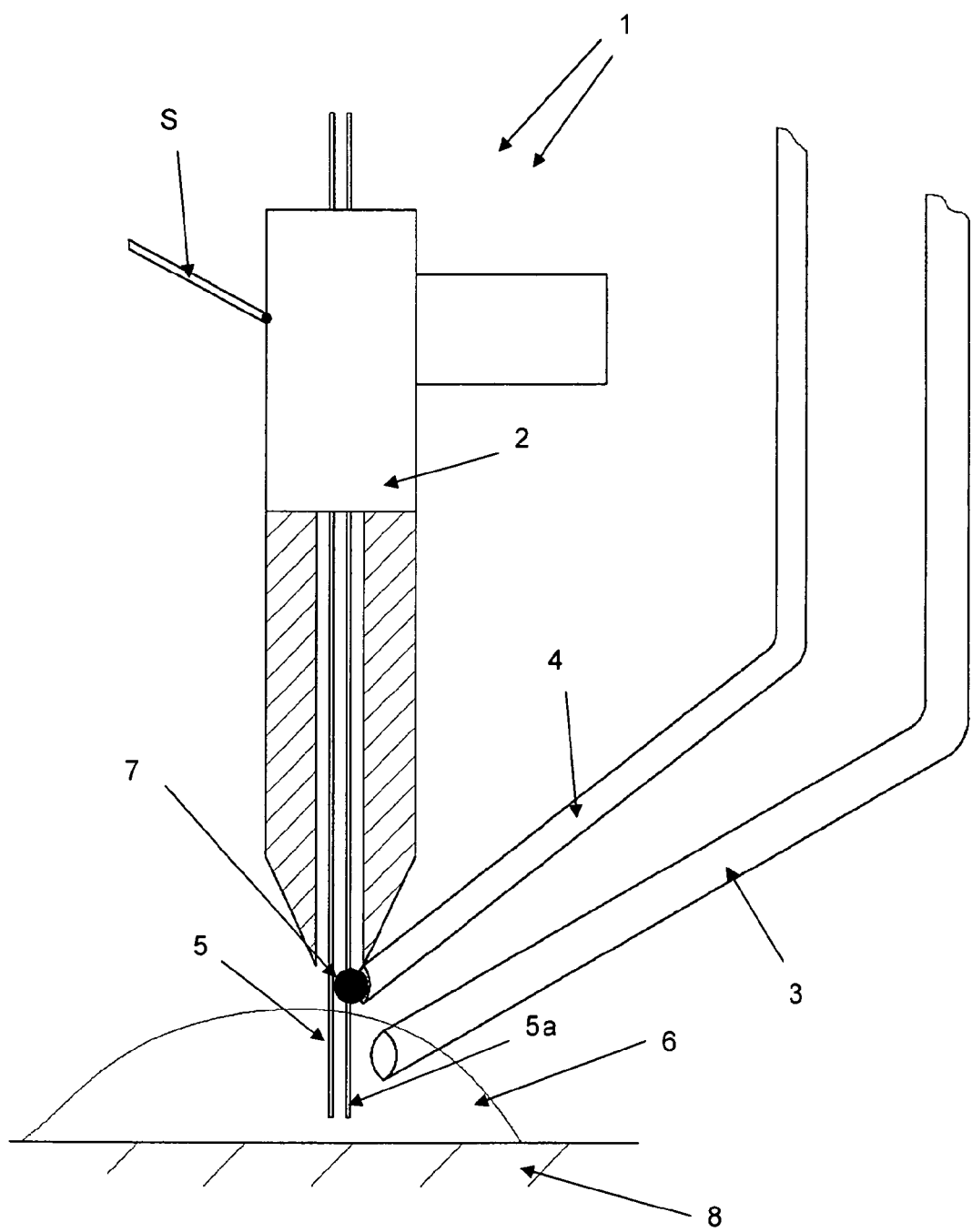
FIG. 1 shows a welding head for a method according to the invention for welding a wear layer onto a parent material.

First of all, reference will be made to FIG. 1. A welding head 1 for carrying out the method according to the invention essentially comprises a first feed device 2 for a first flux-cored wire electrode 5, and a second flux-cored wire electrode 5a, a second feed device 3 for welding powder 6 and a third feed device 4 for metal powder 7. Furthermore, the welding head has an electrical connection S for the electrical welding current that is required. Both the first flux-cored wire electrode 5 and the second flux-cored wire electrode 5a are supplied with welding current. The flux-cored wire electrodes 5 and 5a, the metal powder 7 and the welding powder 6 are also stored in suitable reservoirs and are fed to the welding head 1 by suitable devices.

The first feed device 2 for the flux-cored wire electrodes 5 and 5a is preferably a multi-wire version which is suitable for feeding at least two flux-cored wire electrodes 5 and 5a essentially in parallel, wherein the flux-cored wire electrodes 5 and 5a are preferably aligned transversely with respect to the welding direction. It is also feasible for further flux-cored wire electrodes to be supplied via the same welding head or via one or more additional welding heads. It is, of course, also feasible for the first flux-cored wire electrode 5 to be supplied via a first welding head, and for the second flux-cored wire electrode 5a to be supplied via a further welding head.

The preferred embodiment of the welding head 1 described here is also equipped with an oscillating device, which can cause the welding head 1 to carry out an oscillating movement with respect to the parent material. If the parent material is, for example, in the form of a roller 8, oscillation is possible in a direction parallel to the longitudinal axis of the roller 8. The welding process is generally carried out with an oscillating welding head with a seam width of about 55 mm. This measure can in particular avoid dendritic seam formation, the so-called dendrite trunk. In the end, this measure increases the resistance to cracking of the welded-on layer being more resistant to cracking, overall. In the embodiment of the welding head 1 proposed here, in particular with the two-wire feed mentioned above and the oscillating device, it is possible to produce weld seams with a width of approximately 50 mm and a thickness of approximately 5 to 6 mm. The thickness in this case relates to the thickness above the original parent material surface.

In the preferred embodiment of the present invention as proposed here, the flux-cored wire electrode comprises a tubular casing electrode 11 and a core 10 composed of mineral and/or metallic components. The flux-cored wire electrodes 5, 5a are present in a specified alloyed form without any seams or with a closed shape. The flux-cored wire electrodes 5, 5a have an overall diameter of 2.0 to 3.2 mm. The circular cross-sectional shape of the flux-cored wire electrodes contributes to the desired deep penetration and to the high level of mixing.

The electrical connection S has a welding current of approximately 600-950 A applied to it, thus allowing melting performances of 18-30 kg/h. The current range relates to both flux-cored wire electrodes 5 and 5a overall so that—assuming that each flux-cored wire electrode is supplied with half of the current that is provided—a welding current of approximately 300 to 475 A is applied to each flux-cored wire electrode.

The use of flux-cored wire electrodes 5, 5a instead of solid wire electrodes is not only a result of alloying aspects but also offers the advantage of performance improvement since this makes it possible to reduce the current-carrying cross section and to increase the current density, thus making it possible to increase the melting performance.

The geometric characteristics of the flux-cored wire electrodes 5, 5a, in particular the cylindrical shape of the casing electrode 11 and the selected welding current range result in a high average welding current density. The welding current density is dependent essentially on the cross-sectional area of the casing electrode 11, since the core 10 transmits primarily creepage currents. The relatively high welding current density contributes to the deep penetration desired according to the invention, and to the high level of mixing.

A comparison between a solid wire and one or two flux-cored wire or wires on the assumption that the current density is approximately the same shows a further advantage of flux-cored wires, which results from the comparatively larger circumference and the resulting larger lateral area that is suitable for adhesion of metallic powders.

By way of example, two thinner flux-cored wire electrodes are used, which have a larger circumference than a thicker wire with the same area (see Table 1):

TABLE 1

| Wire diameter [mm] | Area [mm$^2$] | Current [A] | Current density [A/mm$^2$] | Circumference [mm] |
|---|---|---|---|---|
| 1 × 4.0 | 12.56 | 800 | 63 | 12.56 |
| 2 × 2.8 | 12.31 | 800 | 65 | 17.6 |

A larger wire circumference with the same current density leads to increased adhesion of metal powder 7, assuming this powder can be magnetized, and to better and denser adhesion with the same magnetic field strength. Preliminary tests in practice have resulted in a powder-wire ratio of approximately 0.8-1.0:1 which means that it has been possible to increase the melting performance at least by the amount of powder being supplied.

A preferred composition of the flux-cored wire electrode 5 or 5a contains essentially the following alloying elements [in %] as shown in the following table (Table 2):

TABLE 2

| C | Si | Mn | Cr | Ni | Mo | V |
|---|---|---|---|---|---|---|
| <0.08 | 0.20-0.30 | 0.60-0.80 | 24-28 | 6-8 | 1.0-2.0 | 0.1-0.3 |

The composition of the flux-cored wire electrode 5, 5a should be understood as the sum of the alloying elements which are supplied to the weld pool from the molten core 10 and the molten casing electrode 11. However, it must be considered that the core 10 may have quite different alloying components than the casing electrode 11.

An alloying composition which differs from that of the core 10 and in particular has a good magnetizability is selected for the tubular casing electrode 11. This characteristic is thus particularly important in order to allow sufficient metal powder 7 to adhere to the flux-cored wire electrode 5, 5a, which metal powder 7 should be transported into the weld pool. A preferred composition of the casing electrode 11 of the flux-cored wire electrode 5 and/or 5a has at least the alloying elements [in %] listed in the following table (Table 3):

TABLE 3

| C | Si | Mn | P | S |
|---|---|---|---|---|
| <0.05 | <0.10 | <0.40 | <0.015 | <0.015 |

The flux-cored wire electrode 5, 5a can be matched to different requirements by having a different composition. Here, different alloys are possible for different purposes. In the end, the customer can define the alloy, or the alloy is largely predetermined by the function of the work piece. This depends essentially on the flux-cored wire electrode 5, 5a having a higher alloy than the wear layer 9 to be produced and in general than the parent material 8 as well, so that the parent material 8 is alloyed in the oversized weld pool by the addition of higher-alloyed flux-cored wire electrodes 5, 5a and, after cooling down, a wear layer 9 is formed which, in sum, has the desired alloying composition, in particular a comparable or even better alloying composition of a layer which is welded on as a third layer using conventional surfacing by submerged-arc welding. The flux-cored wire electrodes are over-alloyed in comparison to the nominal analysis, in order to compensate in alloying terms for the high penetration (mixing through the parent material 40-50%), that is to say the desired weld deposit analysis is achieved even in the first layer.

It would be possible to use a solid wire alloyed in a corresponding manner to the flux-cored wire electrode, but this would result in the following problems:

1.) An alloy such as this is not available on the market and, as a specially manufactured item, would incur immense costs
2.) In terms of drawing and rolling, deformability is possible only with suitable intermediate annealing.
3.) The chemical composition of a wire such as this restricts the magnetizability since its structure has an austenite content of approximately 30% which, as is known, is not magnetizable.

The opposite approach, of alloying the weld deposit exclusively via the metal powder, likewise fails because of the restricted capability to magnetize it.

The metal powder 7, which is supplied magnetically and in a currentless manner, should correspond to the wear layer 9 to be welded on, in terms of alloying quality aspects. It is, of course, also possible to use predetermined compositions of the metal powder 7, which differ from the weld deposit analysis of the wear layer 9 welded on in a single layer, in order to set desired metallurgical parameters. For this purpose it is advantageously possible to provide that the third feed device 4 for the metal powder 7 is equipped with a metering and/or mixing device, thus making it possible to ensure that the supplied metal powder 7 corresponds to a predeterminable composition, preferably exactly to the weld deposit analysis of a wear layer 9 to be welded on. This prevents the alloying composition being influenced by the welder and the homogeneity of the layer that is welded on being lastingly increased, which leads to a uniform expansion behavior over the entire layer thickness. As a pre-melt alloy corresponding to the weld deposit, the metal powder is present in a gas-atomized or water-atomized form. It should not have any spattered granularity, in order to allow it to be fed without any problems through a metering and/or mixing device. A further possibility is to agglomerate the metal powder, which has the advantage that the alloy can be produced in any desired form. Suitable metering appliances are required both for water-atomized and agglomerated metal powder, which is explained by the grain form and the relatively low powder weight. For example, an alloy composition of the metal powder as follows is proposed for coating continuous cast rollers [in %]

TABLE 4

| C | Si | Mn | Cr | Ni | Mo | V |
|---|---|---|---|---|---|---|
| <0.08 | 0.15-0.30 | 0.4-0.8 | 12-14 | 3-4 | 0.5-1 | 0.10-0.30 |

In the end, this represents one specific application of the proposed method according to the invention, that is to say the alloy composition may, of course, differ for other applications, depending on the wear layer to be welded on.

The welding powder is subject to the requirements such that it is alloying-neutral. In addition, its slag should have high viscosity and good slag solubility even at an increased working temperature, taking into account its use on rotationally symmetrical components. Furthermore, good slag output is required, even at a working temperature of up to 350° C. In addition, there are requirements relating to the viscosity of the slag in order that it forms the seam and does not run away, which would lead to poor slag solubility.

The abovementioned requirement profile is satisfied by a fluoride-based powder with the following composition (Table 5).

TABLE 5

| $SiO_2 + TiO_2$ | $Al_2O_3 + MnO$ | $CaF_2$ |
|---|---|---|
| 10% | 35% | 50% |

Alkalinity level based on Boniszewski: ~1.8

Figure 2:
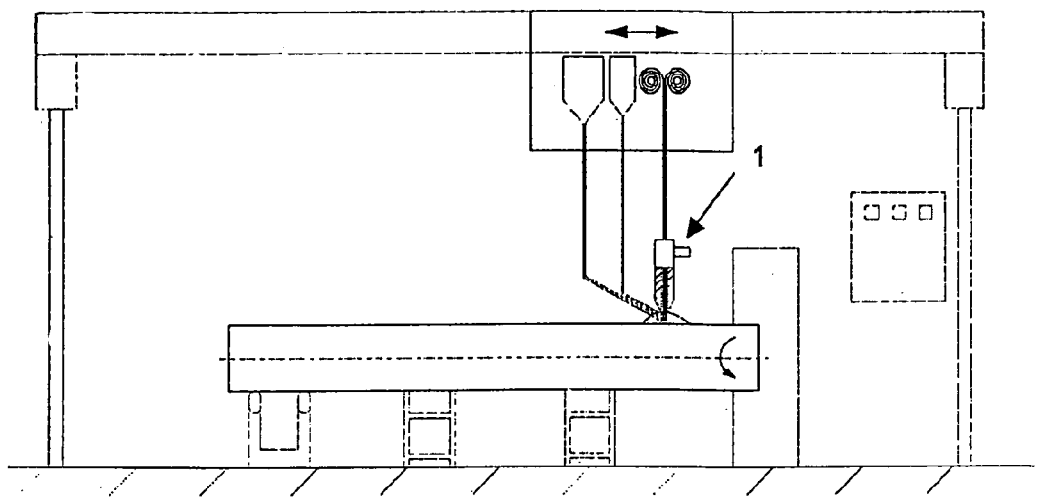
FIG. 2 shows a schematic illustration of a welding installation with a welding head for carrying out the method according to the invention.

FIG. 2 shows an installation for surfacing by welding in order to plate a roller 8. The FIGURE shows a welding head 1 according to the invention, which is arranged above the roller 8. This figure also shows the corresponding components, such as control devices, reservoirs for flux-cored wire electrodes 5 and 5a, metal powder 7 and welding powder 6, as well as the feed device for the welding head 1 according to the invention.

The method for welding a wear layer 9 onto a parent material will be described in the following text using the example of a roller 8 as the parent material. The respectively stated results originate from a first test series. It should be noted that the results of the first test series did not yet completely meet the expectations of the wear layer to be welded on, and in particular the chromium content of the wear layer 9 was not yet high enough. Nevertheless, the results shall be mentioned and explained here, for illustrative purposes.

The roller 8 is caused to rotate at a predetermined rotation speed. An arc is struck between the flux-cored wire electrodes 5, 5a and the roller while at the same time and in a well-controlled manner feeding the first flux-cored wire electrode 5 and the second flux-cored wire electrode 5a, metalliferous powder 7 and welding powder 6. A local weld pool forms on the parent material surface, essentially comprising a mixing zone and a weld bead, in which weld pool both the flux-cored wire electrodes 5 and 5a, the metal powder 7 and a local area of the parent material 8, that is to say of the roller surface, are melted and, after cooling down, form a wear layer 9 and a small proportion of the slag. The welding powder 6 advantageously contributes to the formation of the weld pool and to the dissipation of heat. The wear layer 9 is coated in a helical shape on the roller, corresponding to the feed of the welding head 1 resulting, because of the simultaneous feeding of two flux-cored wires, that is to say a first flux-cored wire electrode 5 and a second flux-cored wire electrode 5a, metal-containing powder 7 and welding powder 6, in a suitable wear layer being formed, in such a way that there is no need to weld on any further layer.

Particularly in the case of the method according to the invention proposed here, the penetration profile of submerged-arc wire welding, which is otherwise rather disadvantageous, is advantageously used in such a way as to result in a mixing level of approximately 40-50% so that this method allows approximately 40-50% of the work piece, which is primarily in an unalloyed form, to be converted to a high-quality weld deposit.

Overall, a wear layer 9 can be formed which comprises approximately 25% of welding wire, 25% of metalliferous powder and 50% of the molten surface of the work piece. With this welding technology, weld deposit thicknesses of 6 to 12 mm are achieved by means of single-layer welding. Crystal orientation occurs in this case virtually at right angles to the component surface, that is to say the crack-critical formation of the dendritic center rib does not occur. A seam profile formation such as this offers better crack resistance particularly in the case of the complex loads on continuous cast rollers, which essentially comprise the operating temperature, thermal shock, corrosion wear and dynamic loading.

Overall, a method is proposed which allows individual weld deposit alloys for different fields of application, in particular for hard-material coating. In particular, a wear-resistant wear layer 9 can be produced in just one welding-on process. There is no need to weld on any further layers, as envisaged in the prior art. Nevertheless, this results in a homogeneous structure in the single wear layer 9, with a uniform analysis over the entire layer area.

Figure 3:
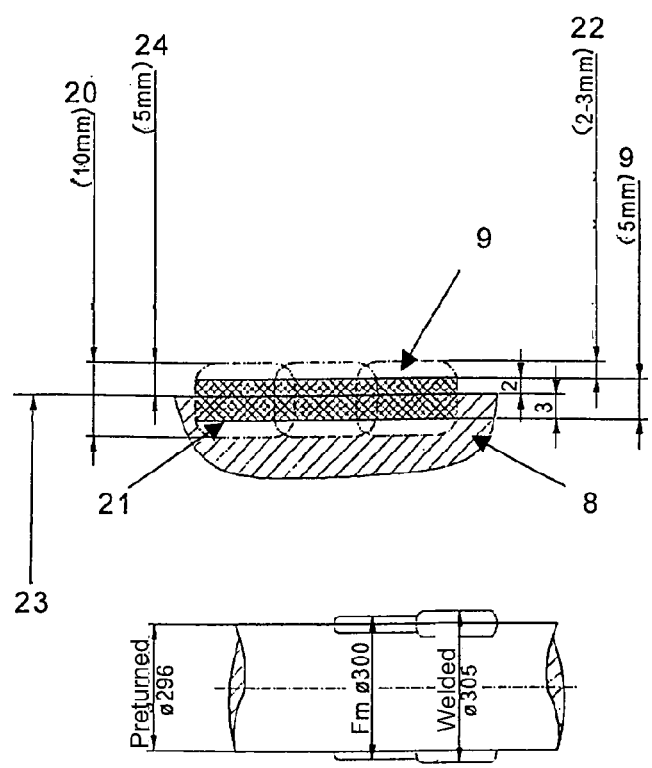
FIG. 3 shows a schematic illustration of the layer thicknesses, using the example of a roller.

In the embodiment proposed here based on the example of surfacing by welding on a cold-rolling roller (see in particular FIG. 3), this results in a total remelted region 20 of about 10 mm. The remelted region is composed of a transitional region 21 between the parent material 8 and the wear layer 9, and the wear layer 9 as such. The wear layer 9 with a thickness of approximately 5 mm is already illustrated here minus a machining allowance 22 of about 2-3 mm. The machining allowance 22 is removed by a metal-cutting process thus resulting in an effective wear layer 9 with a thickness of approximately 5 mm in the example chosen here.

Furthermore the effect of welding on is evident, considering the thicknesses of the individual layers from the surface 23 of the parent material 8. Overall, approximately 3 mm of the wear layer 9 are arranged under the surface 23 of the parent material. An applied layer 24 of approximately 5 mm is indicated above the surface 23 of the parent material, wherein the applied layer 24 comprises a portion of the wear layer 9 and a machining allowance 22 of approximately 2-3 mm.

Figure 4:
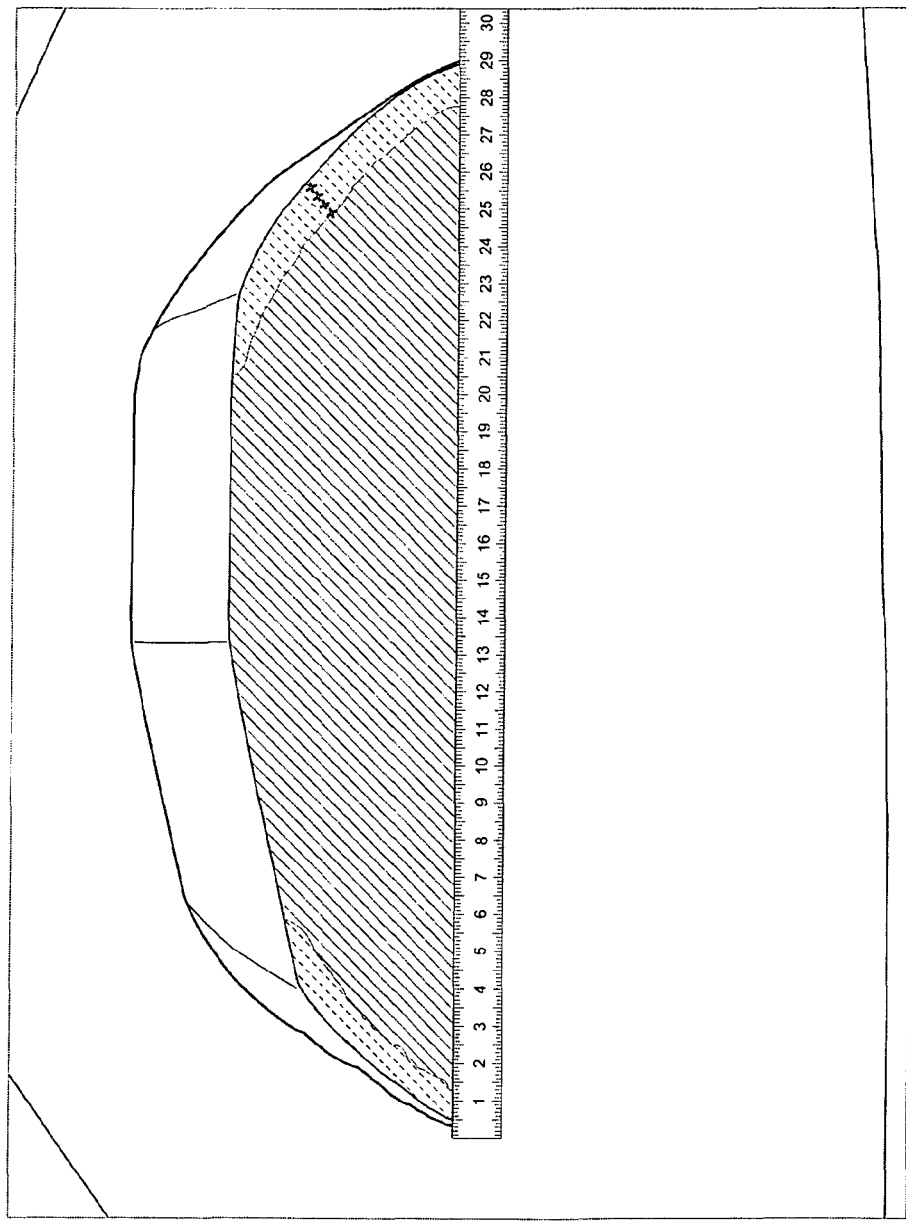
FIG. 4 shows a section through a trial roller (segment) produced using the method according to the invention.
Figure 5:
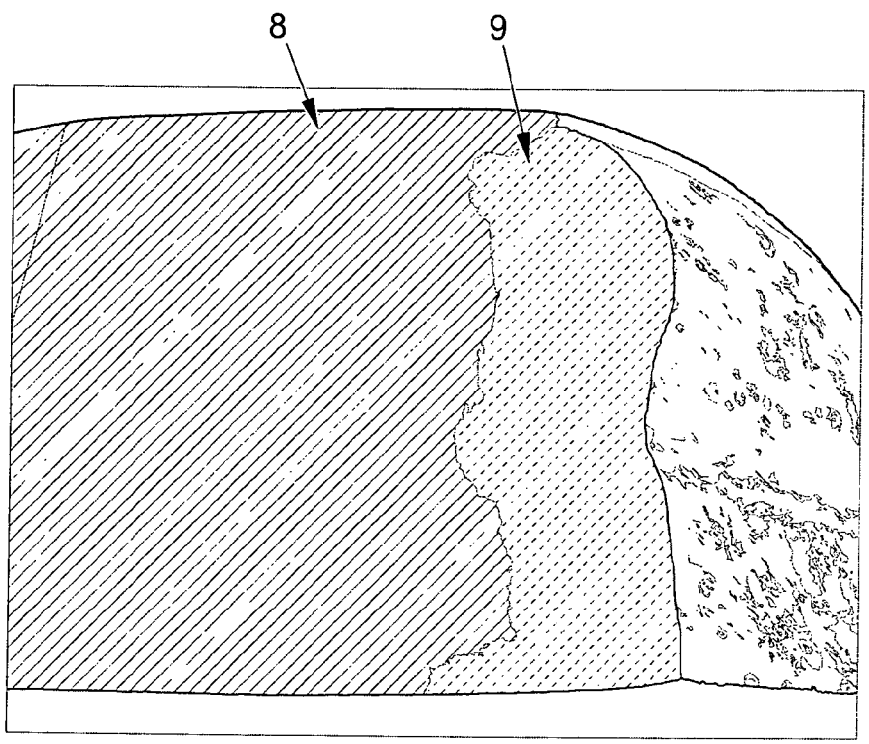
FIG. 5 shows a section through a trial roller (segment) produced using the method according to the invention.

FIGS. 4 and 5 illustrate a segment of a roller which has been processed using the method as proposed according to the invention, wherein the roller segment has been cut out of the roller in some suitable manner.

Figure 6:
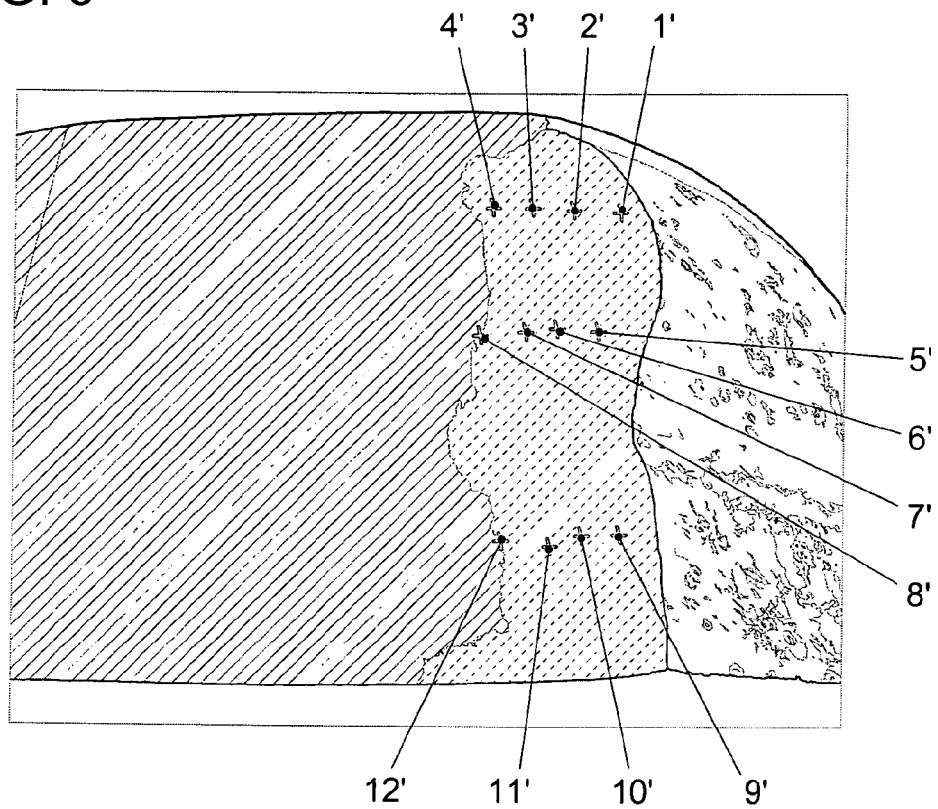
FIG. 6 shows a section through a trial roller (segment) produced using the method according to the invention, showing hardness measurement points.
Figure 7:
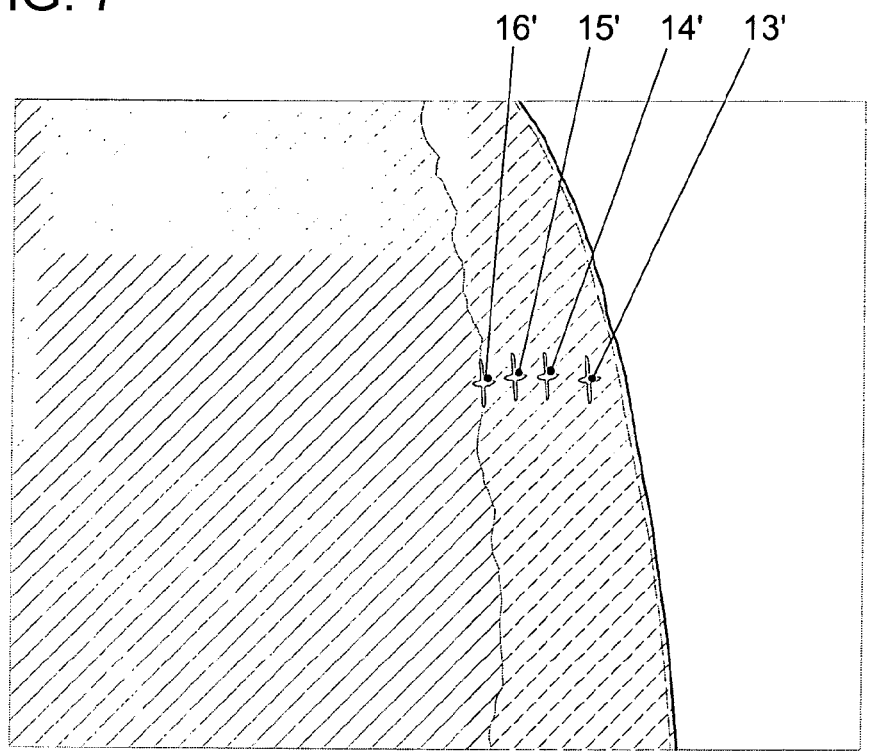
FIG. 7 shows a section through a trial roller (segment) produced using the method according to the invention, showing hardness measurement points.

FIGS. 6 and 7 also show a segment of a test roller which has been sawn out and ground. In order to allow the hardness profile to be seen, hardness tests were carried out at those points identified by numerical FIGURES, and their results are shown in the following Table 6. As can be seen, a desired uniform hardness distribution was achieved over the entire cross section of the wear layer.

TABLE 6

| Position | HRC hardness |
|---|---|
| 1' | 48.0 |
| 2' | 47.5 |
| 3' | 48.4 |
| 4' | 47 |
| 5' | 46.8 |
| 6' | 47.5 |
| 7' | 47.8 |
| 8' | 47.5 |
| 9' | 48.3 |
| 10' | 48.5 |
| 11' | 48.5 |
| 12' | 47.3 |
| 13' | 46.5 |
| 14' | 46.1 |
| 15' | 46.1 |
| 16' | 41.1 |

Figure 8:
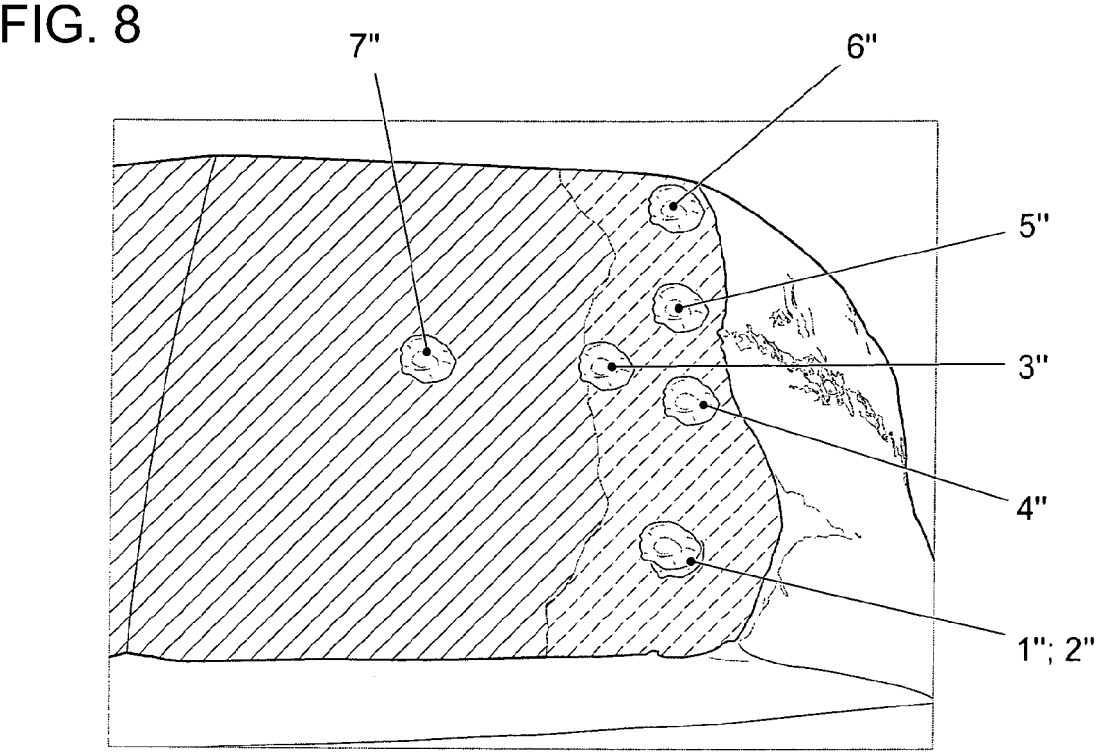
FIG. 8 shows an enlarged illustration of the sample shown in FIGS. 5 and 6, showing material analysis measurement points.
Figure 9:
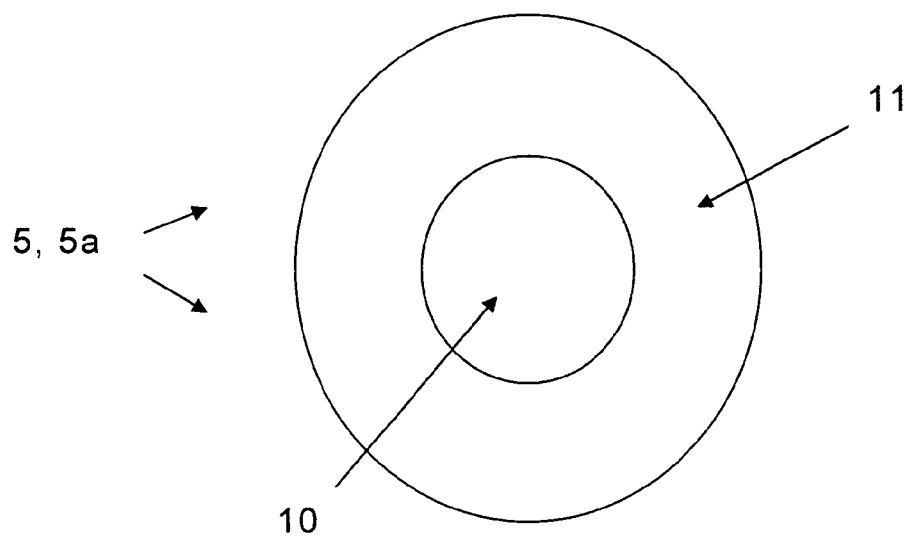
FIG. 9 shows a schematic cross-sectional illustration of a flux-cored wire electrode for the method according to the invention.

This also results in a very homogeneous composition with regard to further metallurgical parameters which were determined, according to FIG. 8, on a milled-off sample. Taking account of the measured values which result from this, and as shown in the following Table 7, an extremely homogeneous distribution of the listed alloying elements can be seen, so that the single wear layer produced according to the invention can ensure usability, in particular for subsequent metal-cutting machining processes, over the entire cross section. The analysis was carried out with a mobile spectrometer at seven measurement points, at different positions on the sample.

TABLE 7

| | C | Si | Mn | Cu | Al | Cr | Mo | Ni | V | Ti | Nb | Co |
|---|---|---|---|---|---|---|---|---|---|---|---|---|
| 2" | 0.079 | 0.55 | 0.83 | 0.19 | 0.022 | 11.81 | 1.68 | 1.89 | 0.17 | <0.01 | 0.04 | 0.08 |
| 3" | 0.103 | 0.53 | 0.81 | 0.19 | 0.021 | 11.34 | 1.66 | 1.86 | 0.17 | <0.01 | 0.04 | 0.07 |
| 4" | 0.087 | 0.53 | 0.84 | 0.20 | 0.021 | 11.7 | 1.68 | 1.86 | 0.17 | <0.01 | 0.04 | 0.08 |
| 5" | 0.091 | 0.53 | 0.81 | 0.19 | 0.021 | 11.66 | 1.66 | 1.85 | 0.16 | <0.01 | 0.04 | 0.08 |
| 6" | 0.082 | 0.55 | 0.88 | 0.19 | 0.024 | 12.89 | 1.70 | 1.95 | 0.16 | <0.01 | 0.04 | 0.09 |
| 7" | 0.224 | 0.43 | 0.47 | 0.23 | 0.011 | 1.33 | 1.2 | 0.17 | 0.28 | <0.01 | 0.02 | 0.04 |

In a further test series it was possible to obtain the following results. It should be noted that it was possible to use the experiences from the first test series in order to optimize the process parameters for the second series of trials. In particular, it was possible to set a preferred chromium content in the wear layer 9 by increasing the chromium content in the core of the flux-cored wire electrodes 5, 5a.

The analytical results relating to a wear layer welded onto a continuous cast roller using the method according to the invention are as follows [in %] (Table 8). The measurement points were located analogously to those on the sample shown in FIG. 8.

TABLE 8

| | C | Si | Mn | Cr | Ni | Mo | V |
|---|---|---|---|---|---|---|---|
| Parent material 21 CrMoV 5 11 | 0.224 | 0.43 | 0.47 | 1.33 | 0.17 | 1.2 | 0.28 |
| Measurement point | | | | | | | |
| 4" | 0.082 | 0.45 | 0.80 | 12.9 | 1.92 | 1.7 | 0.17 |
| 5" | 0.087 | 0.44 | 0.79 | 13.1 | 1.85 | 1.8 | 0.17 |
| 6" | 0.084 | 0.46 | 0.82 | 13.0 | 1.88 | 1.7 | 1.17 |
| Seam transition/ weld deposit | 0.103 | 0.45 | 0.78 | 12.8 | 1.79 | 1.7 | 0.16 |

The result is a highly uniform distribution of the elements.

Hardness measurements were also carried out in the second test series. The respective measured values were taken at comparable measurement points, according to FIGS. 6 and 7. This results in the following hardnesses, according to Table 9:

TABLE 9

| | Measurement point | | | | | | | |
|---|---|---|---|---|---|---|---|---|
| | 1' | 2' | 3' | 4' | 5' | 6' | 7' | 8' |
| HRC | 48.0 | 47.5 | 48.4 | 47.0 | 46.8 | 47.5 | 47.8 | 47.5 |
| Position | SG | SG | SG | SG | SG | SG | SG | SG/Ü |
| | Measurement point | | | | | | | |
| | 9' | 10' | 11' | 12' | 13' | 14' | 15' | 16' |
| HRC | 48.3 | 48.5 | 48.5 | 47.3 | 47.5 | 47.1 | 47.2 | 41.1 |
| Position | SG | SG | SG | SG/Ü | SG | SG | SG | GW |

SG = weld deposit (wear layer)
Ü = transition
GW = parent material

The result of this examination is an extremely homogeneous hardness distribution which complies with the stated requirements. Only measurement point 16' is below the hardness level, because this measurement point was taken from the parent material. The subsequent metal-cutting machining process is therefore ensured over the entire cross section.

The advantageous economic efficiency of the proposed method according to the invention can be illustrated using the following exemplary comparison with conventional surfacing by submerged-arc welding. A roller with a diameter of 300 mm, a length of 1000 mm and a wear layer was preturned to a diameter of approximately 290 mm using the conventional submerged-arc strip welding process, and three layers were then welded on. After the welding process, the roller diameter was 306 mm, which corresponds to an amount of weld deposit applied of 58.8 kg.

In a method proposed according to the invention, the same roller was preturned to 296 mm. After welding on the single wear layer, the roller diameter was 306 mm. However, this corresponds to an amount of weld deposit applied of 37.12 kg. This results in a saving of 21.7 kg of weld deposit in comparison to the method according to the prior art, corresponding to a percentage saving of 36.9%.

Even taking account of the so-called fusion performance of conventional submerged-arc strip welding of about 13 kg/h (submerged-arc wire welding approximately 8 kg/h), the method according to the invention proposed here allows a fusion performance of about 20 kg/h to be achieved, which means a performance improvement of 54% in comparison to the conventional method.

The proposed method according to the invention also results in an advantageous shortening of the welding time, which in particular is because of the fact that only one layer has to be welded on, instead of three layers. For a roller as mentioned by way of example here, the welding time using the conventional submerged-arc strip welding method is about 271 minutes. In contrast, the welding time with the assistance of the method proposed according to the invention is about 111 minutes. The time saving is about 160 minutes, which corresponds to a percentage improvement in performance of approximately 59%.

The invention claimed is:

1. A submerged arc welding method for welding a wear layer onto a parent material, comprising the steps of:
providing a first wire electrode and at least one second wire electrode, the first wire electrode and the at least one second wire electrode each being a flux-cored wire electrode having a core and a casing electrode, the flux-cored wire electrodes having a higher alloy content than a weld deposit content analysis of the wear layer and the casing electrode including an alloy having magnetization characteristics for adhesion of a metal powder;
applying a welding current to the first wire electrode and the at least one second wire electrode;
feeding the wire electrodes continuously to the parent material to produce a common weld pool;
supplying a metal powder to the weld pool; and
supplying a welding powder to the weld pool.

2. The method according to claim 1, wherein the flux-cored wire electrodes have a chromium content which is approximately twice as high as a chromium content of the wear layer.

3. The method according to claim 1, wherein the flux-cored wire electrodes have a nickel content which is approximately twice as high as a nickel content of the wear layer.

4. The method according to claim 1, wherein the flux-cored wire electrode has a molybdenum content which is approximately twice as high as a molybdenum content of the wear layer.

5. The method according to claim 1, wherein the flux-cored wire electrodes have a circular cross-sectional area with a diameter of approximately 2 to 3.2 mm.

6. The method according to claim 1, wherein the applying step comprises applying a welding current of approximately 300 to 475 A to each of the flux-cored wire electrodes.

7. The method according to claim 1 wherein the casing electrode (11) has a volume which is approximately 70% of the total volume of the flux-cored wire electrodes.

8. The method according to claim 1, which comprises applying a direct current to the flux-cored wire electrodes, and connecting a positive pole to the flux-cored wire electrodes.

9. The method according to claim 1, wherein the feeding step comprises feeding the flux-cored wire electrodes in substantially parallel relation at a predetermined transverse distance from one another.

10. The method according to claim 1, including the step of: oscillating the flux-cored wire electrodes transverse relative to a welding direction.

11. The method according to claim 1, wherein the flux-cored wire electrodes have a content of less than approximately 0.08% carbon; 0.2 to 0.3% silicon; 0.6 to 0.8% manganese; 24 to 28.0% chromium; 6 to 8% nickel; 1 to 2% molybdenum; and 0.1 to 0.3% vanadium.

12. The method according to claim 1, wherein the casing electrode (11) has a content of less than approximately 0.05% C, less than approximately 0.10% Si; less than approximately 0.40% Mn; less than approximately 0.015% P; and less than approximately 0.015% S.

13. The method according to claim 1, wherein a composition of the metal powder substantially corresponds to a composition of a weld deposit analysis of the wear layer.

14. The method according to claim 1, wherein the metal powder has ferritic components.

15. The method according to claim 1, which comprises feeding the metal powder in a currentless manner.

16. The method according to claim 1, which comprises using at least one of a gas-atomized and a water-atomized metal powder.

17. The method according to claim 1, which comprises using an agglomerated metal powder.

18. The method according to claim 1, wherein the metal powder has a content of less than approximately 0.08% carbon;
approximately 0.15 to 0.3% silicon; approximately 0.4 to 0.8% manganese;

approximately 12 to 14% chromium; approximately 3 to 4% nickel, approximately 0.5 to 1% molybdenum, and approximately 0.1 to 0.3% vanadium.

19. The method according to claim 1, which comprises using an alloying-neutral welding powder.

20. The method according to claim 1, which comprises using a mineral welding powder.

21. The method according to claim 1, which comprises using a welding powder having a slag with a high viscosity and good solubility at a raised working temperature, when used on rotationally symmetrical components.

22. The method according to claim 1, wherein the welding powder (6) has a content of approximately 10% $SiO_2+TiO_2$; approximately 35% $Al_2O_3+MnO$; and approximately 50% $CaF_2$.

23. The method according to claim 1, wherein the parent material is a roller, including the further steps of: feeding the flux-cored wire electrodes, the metal powder and the welding powder through a welding head rotating the roller underneath the welding head; and pushing the welding head forward in a longitudinal direction of the roller.

24. The method according to claim 1, wherein the wear layer comprises approximately 25% of flux-cored wire, approximately 25% of metalliferous powder, and approximately 50% of a molten surface of the parent material.

* * * * *